(12) United States Patent
De Vries et al.

(10) Patent No.: US 6,956,807 B2
(45) Date of Patent: Oct. 18, 2005

(54) OPTICAL HEAD FOR SCANNING A RECORD CARRIER

(75) Inventors: Jorrit Ernst De Vries, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 448 days.

(21) Appl. No.: 09/968,994

(22) Filed: Oct. 2, 2001

(65) Prior Publication Data

US 2002/0110078 A1 Aug. 15, 2002

(30) Foreign Application Priority Data

Oct. 3, 2000 (EP) .......................................... 00203436

(51) Int. Cl.⁷ .............................................. G11B 7/135
(52) U.S. Cl. .............................. 369/112.06; 369/112.11
(58) Field of Search ...................... 369/112.03–112.08, 369/112.11

(56) References Cited

U.S. PATENT DOCUMENTS

| | | | | |
|---|---|---|---|---|
| 5,696,750 A | * | 12/1997 | Katayama | 369/112.06 |
| 6,166,854 A | * | 12/2000 | Katsuma | 359/569 |
| 6,201,780 B1 | * | 3/2001 | Katayama | 369/112.19 |
| 6,370,103 B1 | * | 4/2002 | Yamazaki et al. | 369/112.26 |
| 6,449,095 B1 | * | 9/2002 | Ohtaki et al. | 359/566 |
| 6,594,222 B2 | * | 7/2003 | Maruyama | 369/112.26 |
| 6,636,365 B2 | * | 10/2003 | Saito et al. | 359/719 |
| 6,760,295 B1 | * | 7/2004 | Maruyama | 369/112.05 |
| 2002/0003767 A1 | * | 1/2002 | Ota et al. | 369/112.09 |

OTHER PUBLICATIONS

"Dual Wavelength Optical Head with a Wavelength Selective Filter for 0.6– and 1.2–mm–Thick–Substrate Optical Disks", by R. Katayama et al., Applied Optics, vol. 38, No. 17, Jun. 10, 1999, pp. 3778–3786.

* cited by examiner

Primary Examiner—Brian E. Miller
Assistant Examiner—Michael V. Battaglia (57) ABSTRACT

A device for scanning a first and second type of optical record carriers (2; 40) generates a first and a second radiation beam for scanning the first and second type of record carriers, respectively, the first radiation beam having a first numerical aperture larger than the second numerical aperture of the second radiation beam. The device includes a non-periodic phase structure that does not affect the first radiation beam. The phase structure introduces an amount of spherical aberration in the second radiation beam for scanning the second type of record carriers for compensating the difference in spherical aberration required for scanning through the different thickness of the transparent layer (3; 41) of the first and second type of record carriers (2, 40). To reduce the amount of stray light on the detection system (25) from rays in the second radiation beam having a numerical aperture larger than the second numerical aperture, the phase grating introduces a discontinuity in the gradient of the wavefront deviation it introduces in the second radiation beam. The discontinuity allows spatial filtering in the plane of the detection system (25) of the desired and undesired rays of the second radiation beam.

20 Claims, 5 Drawing Sheets

OPTICAL HEAD FOR SCANNING A RECORD CARRIER

The invention relates to an optical head for scanning a first and a second, different type of record carrier. The invention also relates to a device for scanning two different types of optical record carrier, the device including the mentioned optical head. Both types of record carriers have an information layer and a transparent layer through which a radiation beam can scan the information layer. The thickness of the transparent layer is different for the two types of record carrier. The optical head includes a radiation source for generating a first radiation beam having a first wavelength for scanning record carriers of the first type and a second radiation beam having a second, different wavelength when scanning a record carrier of the second type. The first radiation beam has a larger numerical aperture than the second radiation beam where it enters the record carrier.

Progress in the field of optical recording results in the regular market introduction of new optical record carriers with higher information densities. In general, such record carriers are designed for being scanned with a radiation beam of a wavelength and numerical aperture different from that used for scanning a previous generation of record carrier. It is desirable that a scanning device designed for the new record carriers can also scan the older record carriers. The scanning device must therefore be adapted in such a way that it can provide two types of radiation beam, one for each type of record carrier. For example, a device suitable for scanning a record carrier of the so-called DVD type, provides a first radiation beam having a wavelength of 660 nm, a numerical aperture (NA) of 0.6 and a spherical aberration compensation for a record carrier substrate thickness of 0.6 mm. In order to write previous generation record carriers of the so-called CD type, the device also provides a second radiation beam having a wavelength of 785 nm, an NA of 0.50 and a spherical aberration compensation for a record carrier substrate thickness of 1.2 mm. The device is preferably provided with a single objective system for focussing the radiation beam onto the record carrier in order to keep the manufacturing costs low.

The article "Dual-wavelength optical head with a wavelength-selective filter for 0.6- and 1.2-mm-thick-substrate optical disks" by Katayama et al, published in the journal Applied Optics, Vol. 38, No. 17, pages 3778 to 3786, discloses an optical head having a single objective system for use in a device that can scan records of both the DVD and CD type. The optical head includes an element having a non-periodic phase structure to compensate for the difference in spherical aberration incurred by the radiation beams when traversing the different thicknesses of the transparent layer. The phase structure includes a plurality of concentric areas forming a pattern of optical paths. The phase structure has a diameter corresponding to the second numerical aperture. A thin-film interference stack is arranged around the phase structure. The phase structure induces spherical aberration in the second radiation beam to compensate for the difference in thickness of the transparent layers. The height difference between neighbouring areas is such that the optical path difference between the areas is equal to an integer times the first wavelength, thereby making the phase structure inactive for the radiation beam of the first wavelength. The interference stack is designed to transmit the first radiation beam and to block the second radiation beam. Thus, the element forms a radiation beam of the first wavelength having a substantially flat wavefront and a diameter corresponding to the larger, first numerical aperture and a radiation beam of the second wavelength having a spherically aberrated wavefront and a diameter corresponding to the smaller second numerical aperture.

A disadvantage of this known optical head is the relatively high cost of the element caused by the presence of both a phase structure and a thin-film stack. Moreover, the thin-film stack is complicated, because it must introduce a predetermined phase shift in the first radiation beam in order to achieve the same wavefront for the part of the radiation beam that has been transmitted through the stack as for the part that has been transmitted through the phase structure.

It is an object of the invention to provide an optical head including a less expensive element having a phase structure.

The object of the invention is achieved by an optical head for scanning a first optical record carrier including a first information layer and a first transparent layer having a first thickness and for scanning a second optical record carrier including a second information layer and a second transparent layer having a second thickness different from the first thickness, the head including a radiation source for generating a first radiation beam having a first wavelength and a second radiation beam having a second wavelength different from the first wavelength, an optical system for converging the first radiation beam with a first numerical aperture through the first transparent layer to a focus on the first information layer and for converging the second radiation beam with a second numerical aperture through the second transparent layer to a focus on the second information layer, the first numerical aperture being larger than the second numerical aperture, the optical system including a non-periodic phase structure for compensating the difference in spherical aberration due to the first and second transparent layer, the phase structure including a plurality of concentric areas forming a pattern of optical paths, the pattern of optical paths forming a wavefront deviation that globally approximates a flat wavefront deviation for the first wavelength and the difference in spherical aberration for the second wavelength, wherein, according to the invention, the phase structure introduces a discontinuity in the gradient of the wavefront of the second radiation beam at the second numerical aperture.

Since a thin-film stack such as present in the known optical head is not necessary in the head according to the invention, the manufacture of the element having the phase structure will be cheaper. Moreover, the absence of the thin-film stack makes it simpler to achieve a flat wavefront over the entire diameter of the first radiation beam, because the correct phase of the first radiation beam can be attained by a judicious choice of the thickness of the areas of the phase structure over the entire diameter of the first radiation beam.

The absence of the thin-film stack causes radiation of the second radiation beam outside the first numerical aperture to reach the record carrier, which may, subsequently, reach the detection system and increase amongst others the noise in the electrical signals generated by the detection system. The known phase structure corrects the phase of the second radiation beam for the difference in spherical aberration but not the propagation direction of the rays in the radiation beam. Hence, the difference in spherical aberration causes the rays near the outer diameter of the second radiation beam to impinge on the detector plane at a distance from the optical axis of the radiation beam that increases gradually with increasing numerical aperture of the ray. The continuous distribution of radiation in the detector plane makes it difficult to discriminate between radiation having a numerical aperture smaller than the second numerical aperture and that having a larger numerical aperture. Capture of rays having a larger numerical aperture results in scanning the second record carrier with a numerical aperture larger than the second numerical aperture. Since tilt of the record carrier introduces a comatic wavefront error proportional to the cube of the numerical aperture, an increase of the scanning numerical aperture reduces the tolerance on the tilt of the record carrier. To avoid this, the detection system should have precisely defined position and dimensions of its radiation sensitive area, which is difficult to realise. Therefore, the phase structure according to the invention introduces a discontinuity in the gradient of the wavefront of the second radiation beam at the diameter corresponding to the second numerical aperture. The discontinuity in the gradient causes a change in the propagation direction of the rays of the second radiation beam, resulting in two separated radiation distributions: a central radiation distribution in the detector plane due to those rays in the second radiation beam having a numerical aperture smaller than the second numerical aperture, separated by a dark ring from an annular radiation distribution due to the rays having a numerical aperture larger than the second numerical aperture. The detection system can now be arranged in the central distribution without tight tolerances on its position or dimensions. Hence, the annular radiation distribution can effectively be kept away from the detection system.

To realise the discontinuity in the gradient of the wavefront, preferably at least part of an area having an outer diameter corresponding to the second numerical aperture has an optical path for the second wavelength that locally forms a wavefront substantially equal to the difference in spherical aberration and other areas have an optical path for the first wavelength that forms a substantially flat wavefront deviation. The rays in the part of the second radiation beam that has locally a wavefront equal to the difference in spherical aberration will be directed to the intersection of the optical axis and the detector plane. The outward neighbouring area of the phase structure is corrected for passage of the first radiation beam through the second transparent layer. Hence, rays in this area of the second radiation beam after passage through the second transparent layer will show a relatively large spherical aberration, directing the rays away from the optical axis. The difference between the two areas causes the desired discontinuity in the gradient of the wavefront of the second radiation beam.

The effect of the phase structure on the first radiation beam is minimised, i.e. the phase structure introduces a globally flat wavefront deviation, if, preferably, the difference between the optical paths of neighbouring areas of the phase structure are substantially equal to an integer times the first wavelength.

A further aspect of the invention relates to a device for scanning two types of optical record carrier, the device including the above optical head and an information-processing unit for error correction. The reduction of the amount of stray light on the detector when scanning a record carrier of the second type reduces the noise in an electrical information signal generated by the detection system and representing the information read from the record carrier. The phase structure also increases the tilt margin of the second record carrier, thereby reducing the amount of the coma in the radiation beam and the associated track-to-track cross talk and inter-symbol interference. The higher quality of the information signal reduces the number of errors in the signal, thereby reducing the demand imposed on the information-processing unit for error correction.

The objects, advantages and features of the invention will be apparent from the following more particular description of preferred embodiments of the invention, as illustrated in the accompanying drawings, in which.

Figure 1:
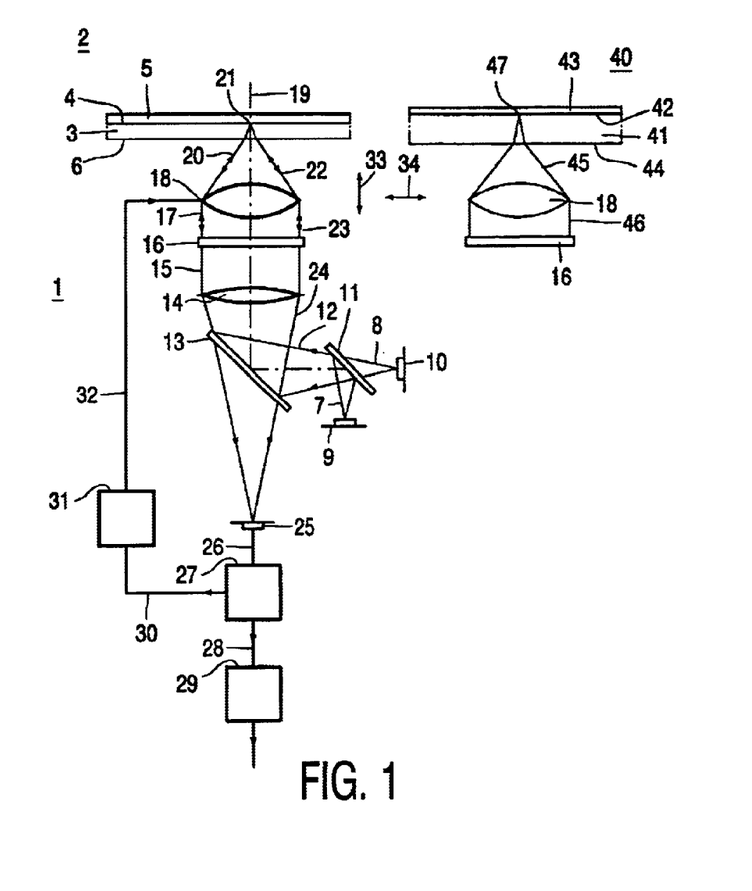
FIG. 1 shows a scanning device according to the invention.

FIG. 1 shows a device 1 for scanning a first type of optical record carrier 2 and a second type of record carrier 40. In the embodiment shown the first type is DVD and the second type is writable CD. The record carrier 2 comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer. Alternatively, the transparent layer may have the sole function of protecting the information layer, while the mechanical support for the information layer is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source that can emit a first and a second radiation beam 7 and 8 having different wavelengths. The radiation source shown in the Figure comprises two semiconductor lasers 9 and 10, emitting the radiation beams 7 and 8. A beam splitter 11, for example a semitransparent plate, combines the paths of the two beams 7 and 8 to a single optical path. The first radiation beam 7 is used for scanning optical record carrier 2 of the first type. The second radiation beam 8 is used for scanning optical record carrier 40 of the second type. A second beam splitter 13 reflects the diverging radiation beam 12 on the optical path towards a collimator lens 14, which converts the diverging beam 12 into a collimated beam 15. The collimated beam 15 is incident on a transparent optical element 16, which modifies the wavefront of the collimated beam. The beam 17 coming from the optical element 16 is incident on an objective system 18. The objective system may comprise one or more lenses and/or gratings. The objective system 18 has an optical axis 19. The objective system 18 changes the beam 17 to a converging beam 20, incident on the entrance face 6 of the record carrier 2. The objective system has a spherical aberration correction adapted for passage of the first radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals. One of the signals is an information signal 28, the value of which represents information read from the information layer 4. The information signal is processed by an information-processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of the track to be followed in the information layer 4. The tracks in the Figure run in a direction perpendicular to the plane of the Figure.

The device of FIG. 1 is adapted to scan also the second type of record carrier 40. This record carrier comprises a thicker transparent layer 41 than the record carrier 2, an information layer 42, a protective layer 43 and an entrance face 44. The device uses the second radiation beam 8 for scanning the information plane 42. The NA of this radiation beam may be adapted to obtain a converging beam 45 having an NA suitable for forming a focal spot 47 for scanning the information layer 42. Suitable values of the NA are a first numerical aperture $NA_1$ of 0.6 for the DVD type record carrier and a second numerical aperture $NA_2$ of 0.5 for the CD type record carrier. The spherical aberration compensation of the objective system 18 is not adapted to the thickness of the transparent layer 41 because of the different wavelength and different thickness of the transparent layer. The optical element 16 is designed to introduce a wavefront deviation having the form of spherical aberration when the second radiation beam passes through it. The amount of spherical aberration is equal to the difference in spherical aberration due to the first and second transparent layer. The spherical aberration introduced in the second radiation beam 46 incident on the objective system is chosen such, that the combined spherical aberration introduced in the radiation beam by the optical element 16 and the objective system 18 compensates the spherical aberration incurred by the radiation beam in passing the transparent layer 41.

Figure 2:
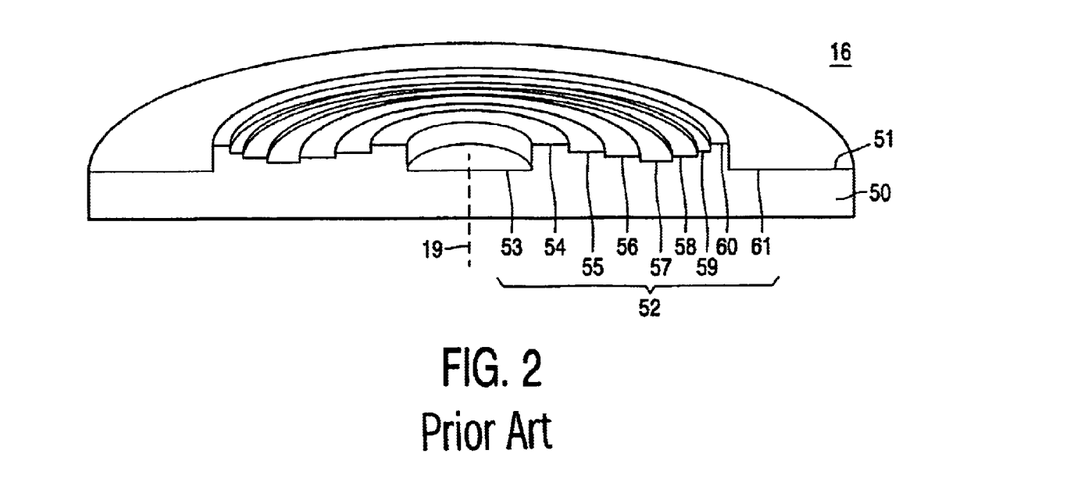
FIG. 2 shows an optical element having a conventional phase structure.

FIG. 2 shows a cross-section through the optical axis 19 of the optical element 16. The optical element comprises a transparent plate 50, one surface 51 of which is provided with a phase structure 52, which is rotationally symmetric around the optical axis 19. The phase structure has a central area 53 and eight concentric annular areas 54 to 61. The areas have different heights, giving rise to different optical paths of the rays of a radiation beam transmitted through the optical element. The height of the areas in the Figure is exaggerated with respect to the thickness and radial extent of the plate 50.

The difference in height between neighbouring areas is equal to a multiple m of a height hi given by $$h_1 = \frac{\lambda_1}{n_1 - 1},$$

where $\lambda_1$ is the first wavelength and $n_1$ is the refractive index of the material of the annular area at the wavelength $\lambda_1$. The multiple m may be any integer value, e.g. −1, 0 or 1. The heights of the concentric areas 54 to 60 relative to the height of the central area 53 are 5, 4, 3, 2, 3, 4 and 5 times $h_1$. The optical path difference (OPD) introduced by neighbouring areas of the phase structure in the first radiation beam of wavelength $\lambda_1$ traversing the optical element is equal to $mh_1(n_1-1)$, which is equal to $m\lambda_1$. As a consequence, the phase structure introduces a flat wavefront deviation to the first radiation beam. In other words, the phase structure does not affect the wavefront of the first radiation beam.

Figure 3:
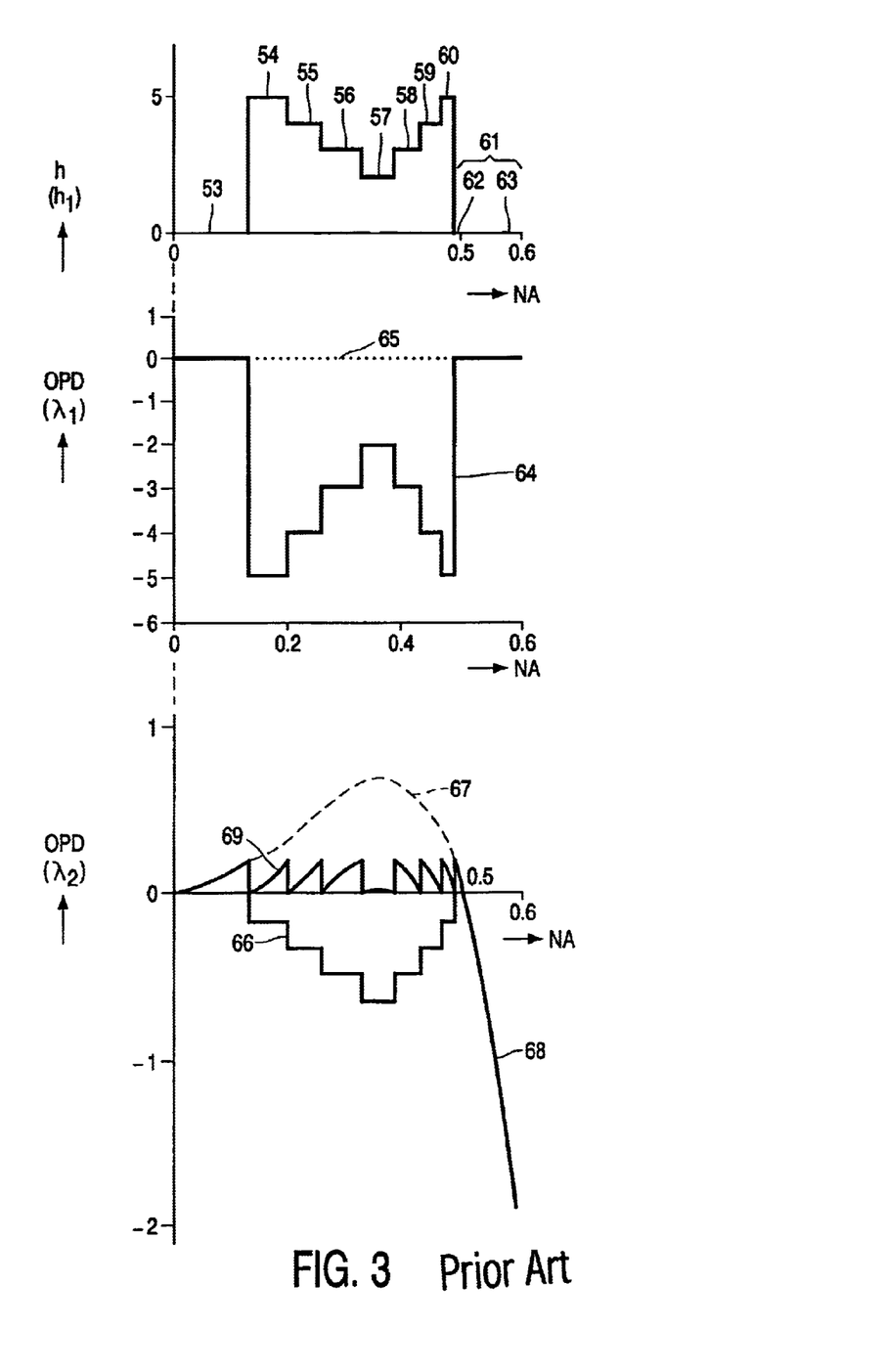
FIG. 3 shows a cross-section of a conventional optical element and its optical path differences for two different wavelengths $\lambda_1$ and $\lambda_2$.

This is shown schematically in FIG. 3. The top diagram shows the height h of the areas of the phase structure in units of $h_1$ as a function of the radius in the phase structure. The radius is expressed in terms of the numerical aperture NA of a ray in the radiation beam, the ray being at a distance equal to the radius from the central ray of the radiation beam. The relation between the radius r and the numerical aperture NA in air for lenses complying with the so-called sine condition is given by NA=r/f, where f is the focal distance of the objective system 18. The Figure shows the NA of 0.5 and 0.6 for the CD and DVD, respectively. Outside area 60 lies an area 62 having zero height and extending up to $NA_2$. Together with the zero-height area 63 it forms the area 61. The drawn line 64 in the middle diagram of FIG. 3 shows the OPD or wavefront deviation introduced in the first radiation beam by the phase structure, the OPD being relative to the optical path of the central ray of the beam in units of $\lambda_1$. The OPDs of the areas 54 to 60 are negative, because the rays are retarded by the phase structure shown in FIG. 2. In other words, the shape of the phase structure is concave in parts where the introduced wavefront deviation is convex. The dashed line 65 in the middle diagram shows the wavefront deviation introduced in the first radiation beam after transmission through the optical element. The wavefront deviation is both globally and locally flat, showing that the optical element does not affect the first radiation beam. The objective system 18 introduces an amount of spherical aberration required for the compensation of the spherical aberration incurred by the first radiation beam in the transparent layer 3 of the first type of record carrier. Hence, the first radiation beam after passage through the optical element 16 and the objective system 18 is correctly compensated for the record carrier of the first type.

When the second radiation beam passes through the optical element 16, its wavefront will be affected, because the radiation beam has a wavelength $\lambda_2$ different from $\lambda_1$, and the optical path differences introduced by the concentric areas are not equal to multiples of $\lambda_2$. The differences will now be determined for the specific phase structure of FIG. 2. The material of the concentric areas is polymethyl-metacrylate (PMMA), having a refractive index $n_1$ of 1.4891 for $\lambda_1$ equal to 660 nm and a refractive index $n_2$ of 1.4861 for $\lambda_2$ equal to 785 nM. Table I shows the fraction of the optical path difference OPD divided by $\lambda_2$, i.e. $\{mh_1(n_2-1) \bmod \lambda_2\}/\lambda_2$ for step heights of $mh_1$ and m having values from 1 to 6. Note, that the largest height in the table gives the smallest OPD.

TABLE I

| m | {OPD mod $\lambda_2$}/$\lambda_2$ |
|---|---|
| 1 | 0.8356 |
| 2 | 0.6712 |
| 3 | 0.5067 |
| 4 | 0.3423 |
| 5 | 0.1779 |
| 6 | 0.0135 |

The heights and radial extent of the annular areas have been chosen to introduce an amount of spherical aberration equal to the sum of the spherical aberration introduced in the converging beam 45 having a wavelength $\lambda_2$ and an NA of 0.5 by a transparent layer of 1.2 mm and the compensation introduced by the objective system 18 in the beam 45. This sum is equal to the difference in spherical aberration due to the difference in thickness of the transparent layers of the record carriers. The sphero-chromatism of the objective system, i.e. the change in spherical aberration introduced by the objective system when the wavelength changes from $\lambda_1$ to $\lambda_2$ is an order of magnitude smaller than the difference, and is regarded as included in the mentioned difference. The desired spherical aberration can be achieved, if the value of m for the areas 53 to 60 has the values shown in the top diagram of FIG. 3 and the radial extent of the annular areas 53 to 60 and 62 expressed as a numerical aperture normalised on $NA_2$ is from 0.239 to 0.352, 0.352 to 0.449, 0.449 to 0.556, 0.556 to 0.830, 0.830 to 0.893, 0.893 to 0.936, 0.936 to 0.971, 0.971 to 1.00, respectively.

The wavefront deviation introduced by the optical element in the second radiation beam is shown by the drawn curve 66 in the bottom diagram of FIG. 3. The OPD along the vertical axis is given in units of $\lambda_2$. The dashed-drawn curve 67–68 is the difference in spherical aberration due to the difference in thickness of the transparent layers of the record carriers. This difference in spherical aberration must be compensated by the optical element 16 up to $NA_2$=0.50, i.e. up to the numerical aperture of second radiation beam with which the second type of record carrier is scanned. The bottom diagram shows, that the stepped wavefront 66 globally approximates the desired spherical aberration 67. However, the approximation is not correct at a local level, i.e. at the level of the concentric areas: each area gives a flat wavefront deviation, whereas the desired wavefront deviation for that area is in general not flat. This discrepancy at the local level causes the correction of the spherical aberration to be not perfect, as shown by the sawtooth-like line 69 in the bottom diagram, being the wavefront near the focal spot 47, also in units of $\lambda_2$. The wavefront is the difference between the wavefront 67 to be corrected and the actual wavefront correction 66 of the optical element. The wavefront 69 should be compared with the wavefront 67 that would have been present near the focal spot 47 if the optical element 16 had not introduced a wavefront deviation in the second radiation beam. The correction of the optical element 16 has reduced the peak wavefront deviation from 0.68 $\lambda_2$ to 0.16 $\lambda_2$ and the RMS OPD from 0.234 $\lambda_2$ to 0.044 $\lambda_2$. The full-width-at-half-maximum (FWHM) of the point spread function of the focal spot 21 for scanning the record carrier 1 of the first type is equal to 0.57 $\mu$m. The FWHM of the focal spot 47 for scanning the record carrier 40 of the second type is equal to 0.81 $\mu$m, being equal to the FWHM of the focal spot formed by an objective system specifically designed for scanning the record carrier 49 with an NA of 0.50.

The optical element with phase structure may be made by using the so-called replication process, in which a layer of lacquer, e.g. Diacryl, is deposited on a substrate, shaped by a mould and hardened by UV illumination. Alternatively, the optical element may be made by injection moulding the entire element in a mould, one half of which is provided with the profile of the phase structure. The optical element may also be operated in reflection. In that case the above formula for $h_1$ must be replaced by $h_1=\lambda_1/2$ and Table I changed accordingly.

Figure 4A:
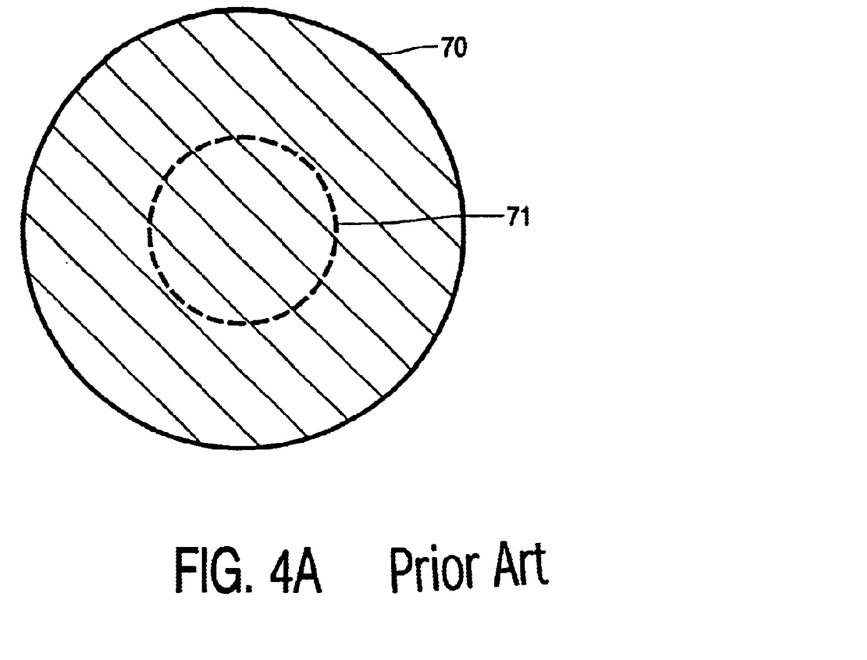
FIGS. 4A and 4B show the radiation distribution in the plane of the detection system for the conventional phase structure and that according to the invention.

The not perfect correction of the second radiation beam by the optical element 16 affects the detection of the radiation beam returning from the record carrier 40 by the detection system 25. If the wavefront of the beam coming from the optical element 16 and travelling towards the detection system had been flat, the collimator lens 14 would focus the rays that make up the beam correctly on the intersection of the optical axis and the detection system. However, the radiation beam returning from the record carrier 40 and incident on the detection system 25 shows the sawtooth profile 69 of the bottom diagram of FIG. 3 in its wavefront. Although the optical element has substantially reduced the phase error of the wavefront, it has not changed the gradient or slope of the wavefront. Since the local normal on the wavefront is the direction of a ray in the radiation beam, the direction of a ray can be found from the normal on the sawtooth profile 69. The rays having an NA smaller than about 0.35 are directed to the right-hand side in the Figure, whereas the rays having a larger NA are directed to the left-hand side. FIG. 4A shows the resulting radiation distribution 70 in the plane of the detection system. The distribution has the highest intensity in the centre, decreasing away from the centre. The dashed circle 71 is the circle within which the rays with numerical aperture smaller than $NA_2$ lie and which should be captured by the detection system. The rays outside this circle have a numerical aperture larger than $NA_2$ and cause noise in the electrical signals generated by the detection system and decrease the tolerances of the device. It is difficult to arrange a detection system such that it captures only rays within the circle 71.

Figure 5:
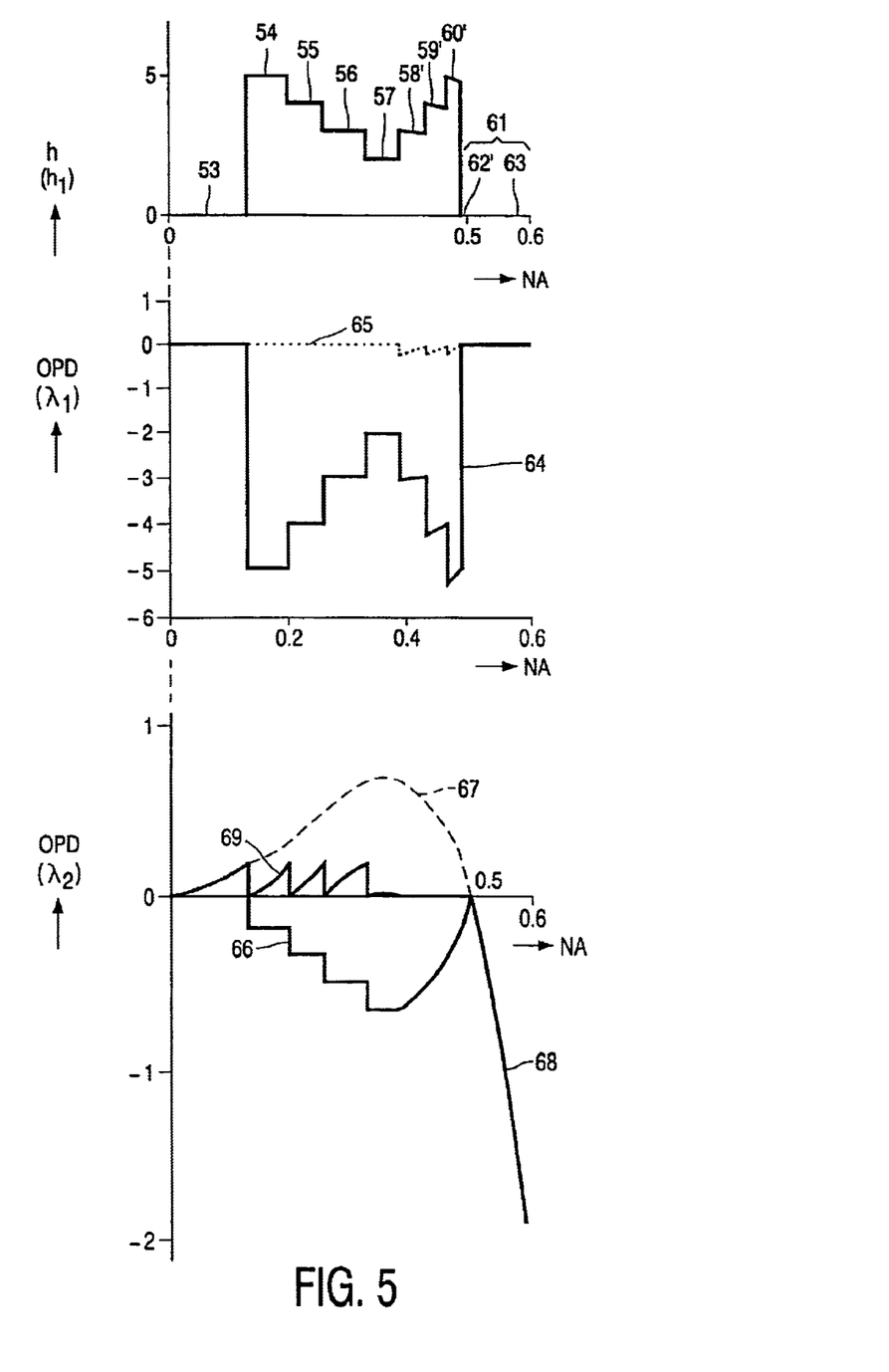
FIG. 5 shows a cross-section of an optical element according to the invention and its optical path differences for two different wavelengths $\lambda_1$ and $\lambda_2$.

The invention solves this problem by modifying the above conventional phase structure. The cross-section of the phase structure according to the invention is shown in the top diagram of FIG. 5. The structure has level upper sides in the areas 54 to 57, as in the phase structure shown in FIG. 3. The areas 58', 59', and 60' have slanting upper sides instead of level upper sides. Likewise, area 60' has a slanting upper side. The middle diagram of FIG. 5 shows that the wavefront 65' for the first radiation beam globally approximates a flat wavefront as required for compensation of the spherical aberration incurred by the first radiation beam when traversing the transparent layer 3. However, locally, the compensation is only correct for areas 53 to 57, where each of the areas forms a substantially flat wavefront. The compensation is not perfect for the areas 58' to 60' and 62', showing small sawteeth in the wavefront, as drawn in the Figure. This imperfect compensation reduces the so-called Strehl intensity of the spot 21 from 1.00 to 0.93, which a relatively small deterioration of the spot for scanning record carrier 2.

The bottom diagram of FIG. 5 shows the OPDs of the areas for the second radiation beam. The compensation of the areas 53 to 57 is not perfect, similar to that of the conventional phase structure. The degree of slanting of the upper sides of the phase structure in the areas 58' to 60' and 61' is chosen to form a wavefront that is locally equal to the difference in spherical aberration 67, thereby giving a near perfect compensation. The upper sides may be curved instead of straight to provide a better match with the wavefront. The good compensation is shown in the Figure by the flat wavefront 69 between NA=0.35 and 0.5. There is no compensation in the area 63, i.e. for rays having a numerical aperture larger than $NA_2$, resulting in a large gradient in the wavefront characteristic for spherical aberration. The transition in compensation from area 61' to area 62 causes a discontinuity in the gradient of the wavefront, shown in the bottom diagram by the bend in the OPD 69' at $NA_2$=0.50. The rays having an NA smaller than about 0.35 are directed to the right-hand side in the Figure. The rays having an NA between 0.35 and 0.50 are directed to the optical axis and focus properly on the detection system 25. The rays having an NA larger than 0.50 are directed to the left-hand side in the Figure.

Figure 4B:
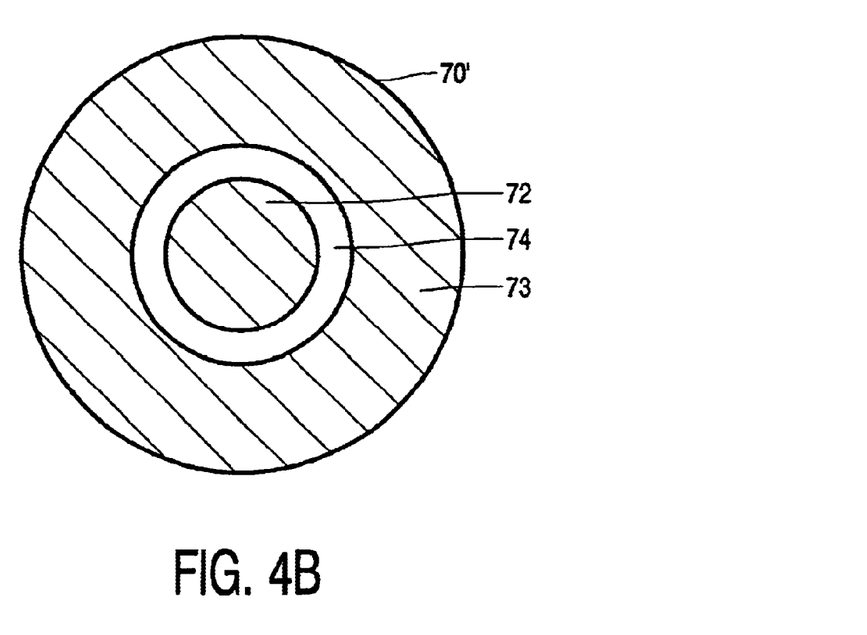

FIG. 4B shows the radiation distribution 70' in the plane of the detection system 25 of the second radiation beam when using the phase structure according to the invention. The distribution includes a central part 72 and an annular part 73, separated by an dark ring 74. The rays having a numerical aperture smaller than $NA_2$ are confined to the central part 72. The rays having a larger numerical aperture fall in the annular part 74. The phase structure according to the invention provides a proper definition of the numerical aperture in the plane of the detection system for the second radiation beam, allowing an accurate spatial filtering of the desired and undesired rays. The dark ring allows a proper positioning of the detection system, relatively independent of the actual dimensions of the radiation sensitive area of the detection system.

Figure 6A:
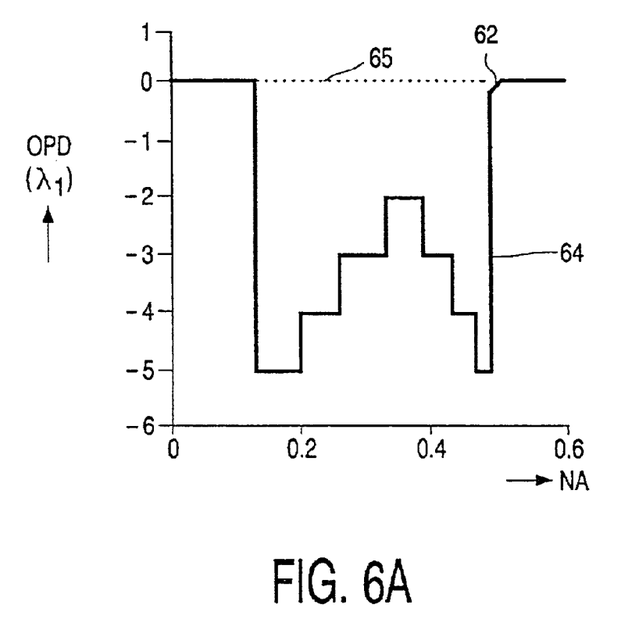
FIGS. 6A and B show cross-sections of further embodiments of the phase structure.
Figure 6B:
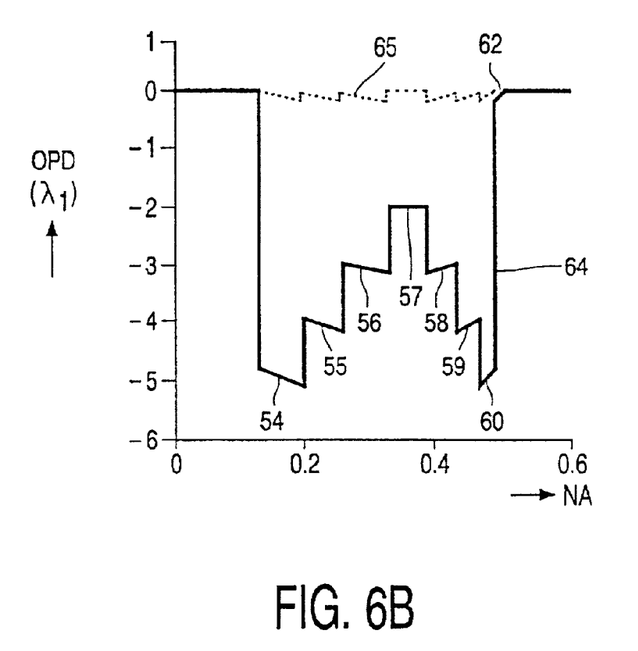

The embodiment of the phase grating shown in FIG. 5 has adapted areas 58, 59, 60 and 62 to provide proper spherical aberration compensation of the second radiation beam. The number of areas providing this compensation may be larger or smaller and may be limited to part of an area. An increase in the number of areas will improve the quality of the spot 47 for scanning record carriers of the second type, whereas a decrease in the number of areas will improve the quality of the spot 21 for scanning record carriers of the first type. FIG. 6 shows the OPDs of two further embodiments of the phase structure according to the invention. In FIG. 6A only one area 62 has been adapted. The OPD 64 of the area 61 causes a sawtooth shape in the wavefront 65 of the first radiation beam. In FIG. 6B the areas 54 to 60 and 62 have been adapted. The wavefront 65 has deteriorated considerably compared to the wavefront in FIG. 6A. Table II shows the wavefront deterioration, expressed as a reduction of the Strehl intensity of the spots 21 and 47, for the three embodiments of the phase grating discussed in the previous paragraphs.

TABLE II

| Embodiment | Adapted areas | Strehl ratio DVD | Strehl ratio CD |
|---|---|---|---|
| FIG. 6A | 62 | 0.992 | 0.893 |
| FIG. 5 | 58–60, 62 | 0.932 | 0.922 |
| FIG. 6B | 54–60, 62 | 0.883 | 0.978 |

Table II shows, that an increase in the number of adapted areas increases the Strehl intensity of the spot 47 for CD and decreases the Strehl intensity of the spot 21 for DVD. To obtain suppression of stray light, the areas having a numerical aperture between 0.95 $NA_2$ and $NA_2$ should be adapted. However, the amount of stray light still intercepted by the detection system when using such a phase, such as the one shown in FIG. 6A, makes the device using this phase structure less suitable for high-performance applications. An adaptation of the areas having a numerical aperture between 0.90 $NA_2$ and $NA_2$, such as in the embodiments of FIGS. 5 and 6B, makes the amount of intercepted stray light insignificantly small. Therefore, suppression of the stray light should preferably be achieved by adapting the areas or parts thereof within a zone having a numerical aperture from at most 0.95 $NA_2$ to $NA_2$ and, more preferably, from at most 0.90 $NA_2$ to $NA_2$. The choice between the various embodiments depends on the acceptable amount of stray light on the detection system and the desired quality of the spot 21.

Although the phase grating is arranged on or in a plate 50 in the embodiment shown in FIG. 1, the phase grating may also be arranged on or in any other optical element, such as the collimator lens 14, the beam splitter 13, in particular if it is a cube beam splitter, or the objective system 18, preferably on a surface of a lens of the system facing the radiation source 10.

What is claimed is:

1. An optical head for scanning a first optical record carrier including a first information layer and a first transparent layer having a first thickness and for scanning a second optical record carrier including a second information layer and a second transparent layer having a second thickness different from the first thickness, the head including a radiation source for generating a first radiation beam having a first wavelength and a second radiation beam having a second wavelength different from the first wavelength, an optical system for converging the first radiation beam with a first numerical aperture through the first transparent layer to a focus on the first information layer and for converging the second radiation beam with a second numerical aperture through the second transparent layer to a focus on the second information layer, the first numerical aperture being larger than the second numerical aperture, the optical system including a non-periodic phase structure for compensating the difference in spherical aberration due to the first and second transparent layer, the phase structure including a plurality of concentric areas forming a pattern of optical paths, the pattern of optical paths forming a wavefront deviation that globally approximates a flat wavefront deviation for the first wavelength and the difference in spherical aberration for the second wavelength, wherein the phase structure introduces a discontinuity in the gradient of the wavefront of the second radiation beam at the second numerical aperture; and wherein a first one of the plurality of concentric areas has a slanting surface and a second and third ones of the plurality of concentric areas have level surfaces, the first concentric area being positioned radially outward from the second and third concentric areas.

2. The optical head according to claim 1, wherein at least part of one of the concentric areas having an outer diameter substantially corresponding to the second numerical aperture has an optical path for the second wavelength that locally forms a wavefront substantially equal to the difference in spherical aberration and other concentric areas have an optical path for the first wavelength that forms a substantially flat wavefront.

3. The optical head according to claim 1, wherein the difference between the optical paths of neighbouring areas of the phase structure is substantially equal to an integer times the first wavelength.

4. A device for scanning two types of optical record carrier, the device including an optical head according to claim 1 and an information processing unit for error correction.

5. The optical head of claim 1, wherein the optical system comprises at least one beam splitter, a collimator lens, a transparent optical element, and an objective system.

6. The optical head of claim 5, wherein one of the at least one beam splitter, the collimator lens, the transparent optical element, or the objective system comprises the non-periodic phase structure.

7. The optical head of claim 1, wherein:

the first wavelength equals 660 nanometers;

the first numerical aperture equals 0.6;

the first transparent layer has a thickness of 0.6 millimeters;

the second wavelength equals 785 nanometers;

the second numerical aperture equals 0.5; and the second transparent layer has a thickness of 1.2 millimeters.

8. A device, comprising:

a radiation source capable of generating a first radiation beam having a first wavelength and a second radiation beam having a second wavelength; and an optical system capable of focusing the first radiation beam on a first information layer of a first optical record carrier and capable of focusing the second radiation beam on a second information layer of a second optical record carrier, the optical system comprising a phase structure comprising a plurality of concentric areas, a first one of the plurality of concentric areas having a slanting surface, a second and third ones of the plurality of concentric areas having level surfaces, wherein the first concentric area is positioned radially outward from the second and third concentric areas.

9. The device of claim 8, wherein:

the first optical record carrier comprises a first transparent layer having a first thickness;

the second optical record carrier comprises a second transparent layer having a second thickness different from the first thickness; and the second wavelength is different from the first wavelength.

10. The device of claim 9, wherein:

the optical system is capable of converging the first radiation beam with a first numerical aperture through the first transparent layer to a focus on the first information layer; and the optical system is capable of converging the second radiation beam with a second numerical aperture through the second transparent layer to a focus on the second information layer, the first numerical aperture larger than the second numerical aperture.

11. The device of claim 10, wherein the phase structure is capable of compensating for a difference in spherical aberration due to the first and second transparent layers.

12. The device of claim 11, wherein the plurality of concentric areas form a pattern of optical paths, the pattern of optical paths forming a wavefront deviation that globally approximates a flat wavefront deviation for the first wavelength and the difference in spherical aberration for the second wavelength.

13. The device of claim 12, wherein the phase structure is capable of introducing a discontinuity in a gradient of the wavefront of the second radiation beam at the second numerical aperture.

14. The device of claim 8, wherein the optical system comprises at least one beam splitter, a collimator lens, a transparent optical element, and an objective system.

15. The device of claim 14, wherein one of the at least one beam splitter, the collimator lens, the transparent optical element, or the objective system comprises the phase structure.

16. The device of claim 8, further comprising an information processing unit capable of performing error correction.

17. The device of claim 16, wherein the information processing unit is capable of performing at least one of: focus error signal correction and radial error signal correction.

18. A method, comprising:

generating a first radiation beam having a first wavelength;

focusing the first radiation beam on a first information layer of a first optical record carrier;

generating a second radiation beam having a second wavelength; and focusing the second radiation beam on a second information layer of a second optical record carrier;

wherein focusing the first radiation beam and focusing the second radiation beam comprises passing the first and second radiation beams through a phase structure, the phase structure comprising a plurality of concentric areas, a first one of the plurality of concentric areas having a slanting surface, a second and third ones of the plurality of concentric areas having level surfaces, wherein the first concentric area is positioned radially outward from the second and third concentric areas.

19. The method of claim 18, wherein an optical system is used to focus the first and second radiation beams, the optical system comprising at least one beam splitter, a collimator lens, a transparent optical element, and an objective system.

20. The method of claim 19, wherein one of the at least one beam splitter, the collimator lens, the transparent optical element, or the objective system comprises the phase structure.

* * * * *